United States Patent

Wolters et al.

Patent Number: 5,878,712
Date of Patent: Mar. 9, 1999

[54] SYSTEM FOR THE DIRECT INJECTION OF FUEL IN INTERNAL-COMBUSTION ENGINES

[75] Inventors: Peter Wolters, Eschweiler; Michael Grigo, Stolberg, both of Germany; Jose Geiger, Hauset, Belgium

[73] Assignee: FEV Motorentechnik GmbH & Co. KG, Aachen, Germany

[21] Appl. No.: 934,596

[22] Filed: Sep. 22, 1997

[30] Foreign Application Priority Data

Sep. 20, 1996 [DE] Germany ............ 196 38 559.8
Sep. 19, 1997 [DE] Germany ............ 197 41 380.3

[51] Int. Cl.⁶ ..................................... F02B 17/00
[52] U.S. Cl. ................ 123/301; 123/305; 123/308
[58] Field of Search ........................ 123/301, 302, 123/305, 307, 308, 276, 279, 284

[56] References Cited

U.S. PATENT DOCUMENTS

| 4,162,661 | 7/1979 | Nakanishi et al. ............ 123/307 |
| 5,127,379 | 7/1992 | Kobayashi et al. ............ 123/302 |
| 5,215,053 | 6/1993 | Ito ...................................... 123/276 |
| 5,553,588 | 9/1996 | Gono et al. .................... 123/276 |
| 5,632,244 | 5/1997 | Endres et al. . | |
| 5,669,348 | 9/1997 | Nishigaki ....................... 123/308 |
| 5,730,099 | 3/1998 | Gillespie ........................ 123/305 |

FOREIGN PATENT DOCUMENTS

| 165624 | 3/1950 | Austria ............................ 123/279 |
| 0 463 613 | 1/1992 | European Pat. Off. . | |
| 0 558 072 | 9/1993 | European Pat. Off. . | |
| 2 112 859 | 7/1983 | United Kingdom ........... 123/301 |

Primary Examiner—Erick R. Solis
Attorney, Agent, or Firm—Venable; Gabor J. Kelemen

[57] ABSTRACT

An internal-combustion engine includes a cylinder, a piston reciprocating therein, intake and exhaust ports, a fuel injection nozzle opening into the combustion chamber of the cylinder and an ignition device situated in the top wall of the cylinder. The top wall of the cylinder as well as the piston base oriented towards the top wall each has first and second surfaces being inclined to one another and meeting in a ridge, whereby the top wall and the piston base have an essentially V-shaped configuration when viewed in a sectional plane taken along the cylinder axis. The first surface of the top wall faces and is parallel with the first surface of the piston base and the second surface of the top wall faces and is parallel with the second surface of the piston base. A dished depression is provided in the piston base such that the depression interrupts the ridge and extends on either side thereof, whereby the dished depression is bounded by the first and second surfaces of the piston base.

7 Claims, 2 Drawing Sheets

SYSTEM FOR THE DIRECT INJECTION OF FUEL IN INTERNAL-COMBUSTION ENGINES

BACKGROUND OF THE INVENTION

This invention relates to a fuel injection system for a spark-ignited piston-type internal-combustion engine and includes a fuel injector by means of which fuel is directly injected into the work chamber of the engine cylinder. As concerns the moment of such injection, essentially two types of operational modes are known.

In the first type of operation, also referred to as a "homogenous operation", the fuel is injected at an early moment, generally during the inflow of fresh air, that is, while the intake valve is open. This mode of operation which ensures a good homogenization of the fuel/air mixture, is particularly expedient during a high-load engine run.

In a second type of operation, also referred to as a "stratified-charge operation", the injection of fuel occurs only after the air intake valve is closed and when the upwardly moving piston arrives in the region of its upper dead center. As a result, the fuel is mixed only with one part of the intake air contained in the cylinder and only in a locally limited manner until the mixture is ignited by the ignition system. Such an operation is preferably used during partial-load conditions and during idling. It is an advantage of this operational mode that the engine may run without throttling the intake air and yet without obtaining, in the vicinity of the ignition device, an excessively lean fuel/air mixture which would jeopardize a reliable ignition.

The above-outlined two operational modes may be performed by various methods for introducing the fuel in the cylinder chamber and for providing a fuel/air mixture. These processes may be subdivided into two categories, namely the "jet-guided" and the "wall-guided" processes.

In the "jet-guided" process the injected fuel jet is aimed directly onto the ignition device. The injected fuel cloud mixes with the combustion air and is ignited by the ignition device. A reliable stratified-charge operation is accordingly ensured only if the ignition device is positioned very close to the fuel injector. Such an arrangement involves the disadvantage that only an extremely small operational point-specific ignition window is available and therefore a coordination (tuning) of the fuel jet expansion for large characteristic field ranges is critical. Consequently, the fuel injectors used in such systems have to be manufactured with high precision; even small tolerance deviations or changes in the injector during an extended operation may lead to disadvantageous boundary conditions for the ignition.

Thus, conditions of a reliable ignition in the stratified-charge operation may be ensured only by means of a precise geometrical arrangement of the ignition device and the fuel jet. Consequently, the known methods belonging to this category are designed without a definite and intensive charge motion. In the homogeneous operation, on the other hand, it is precisely such a charge motion that would be needed for improving the homogenization of the fuel/air mixture. The result is loss of power and an increase of the fuel consumption which, in turn, involves a correspondingly heightened release of pollutants into the atmosphere.

It is a further disadvantage of this process that because of the direct exposure of the ignition device to the fuel jet, an increased wear occurs, resulting in a shortened service life of the ignition devices.

According to the "wall-guided" process, in the stratified-charge operation the fuel jet is deflected towards the ignition device by that wall of the combustion chamber which is formed by the piston base. The resulting intensive charge motion has an enhancing effect. This method avoids a direct impingement of fuel on the spark plugs. Tolerance deviations and the operational condition of the fuel injectors are less critical than in the earlier-discussed jet-guided process. It is, however, a disadvantage of the wall-guided process that the fuel impinges on the combustion chamber wall, particularly on the piston base, during a direct injection into the cylinder chamber so that in certain operational conditions an incomplete combustion occurs which results in an increased emission of uncombusted hydrocarbons and soot. This process has been utilized heretofore with intake-side fuel injectors and is based on the formation of a rolling motion of the charge, which is particularly designed with respect to direction and sense of rotation and which guides the mixture jet, in the direction of injection, via the piston base to the ignition device. This type of charge motion is achieved by providing steep, upstanding intake ports, such as disclosed in European Patent No. 0 558 072. Such an arrangement, however, requires a correspondingly greater structural height of the engine. According to another solution, the desired motional configuration of the charge is obtained by a special form of the intake port or by the geometry at the seating zone of the intake valve, as disclosed in European Patent No. 0 463 613. Such a solution, however, has disadvantageous effects on the quality of flow of the intake system and thus on the full-load operation of the engine. In both cases the injection jet is directed towards a depression of the piston base, so that precisely in case of a stratified-charge operation fuel which is still in a liquid state impinges on the piston base. The mixture which is formed there is then, while in contact with the wall of the piston base, guided to the ignition device.

The intensive charge motion required in the stratified-charge operation in this process is, however, disadvantageous in the homogeneous operation because of the resulting increased combustion noises and increased wall heat losses.

SUMMARY OF THE INVENTION

It is an object of the invention to provide, in a spark-ignited, reciprocating piston type internal-combustion engine, an improved direct fuel injection of the type outlined earlier which substantially eliminates the above-discussed disadvantages of prior art arrangements.

This object and others to become apparent as the specification progresses, are accomplished by the invention, according to which, briefly stated, the internal-combustion engine incorporating the invention includes a cylinder, a piston reciprocating therein, intake and exhaust ports, a fuel injection nozzle opening into the combustion chamber of the cylinder and an ignition device situated in the top wall of the cylinder. The top wall of the cylinder as well as the piston base oriented towards the top wall each has first and second surfaces being inclined to one another and meeting in a ridge, whereby the top wall and the piston base have a V-shaped configuration when viewed in a sectional plane taken along the cylinder axis. The first surface of the top wall faces and is parallel with the first surface of the piston base, and the second surface of the top wall faces and is parallel with the second surface of the piston base. A dished depression is provided in the piston base such that the depression interrupts the ridge and extends on either side thereof, whereby the dished depression is bounded by the first and second surfaces of the piston base.

The advantage of the invention in an engine where the intake port has a normally designed course, resides primarily in that by means of the cross-sectionally inverted V-shaped (that is, roof-shaped) configuration of the top cylinder wall and also the piston base, a combustion chamber is provided which is only slightly jagged in configuration, so that in conjunction with the dish-shaped depression provided in the piston base a motion of the cylinder charge is obtained which is directed towards the fuel injection nozzle. Particularly in the stratified-charge operation via the piston base only air is guided towards the fuel injection nozzle and then fuel is injected into such air. In this manner an improved mixture preparation in the immediate vicinity of the air intake valve results, because in the stratified-charge operation, when the fuel injection occurs at a moment after closure of the exhaust valve, the piston is in the vicinity of its upper dead center during its upward motion. The air flow changes its direction in the region of the fuel injection nozzle and is guided along the cylinder top towards the ignition device. Despite the reduced volume of the combustion chamber, for forming the fuel/air mixture, in such an arrangement a long, free jet path with optimal mixture formation is present for the fuel in the direction of the air flow in the cylinder toward the ignition device. In such a process only little fuel is applied to the cylinder walls. By virtue of the particular positioning of the fuel injection nozzle the fuel jet propagates in a very flat course. The fan-like expanded fuel jet may enter the combustion chamber in the zone of the dished recess in the piston base in a highly satisfactory manner practically without wetting the piston base even in the stratified-charge operation. In such an arrangement it is particularly expedient to arrange the outlet of the fuel injection nozzle approximately at the height of the lower edge of the intake opening of the air intake valve.

It is of particular advantage to use the invention in internal-combustion engines having cylinders with two air intake valves. In such an arrangement the fuel injection nozzle opens into the cylinder in a region between the two air intake valves.

DESCRIPTION OF THE PREFERRED EMBODIMENT

Figure 1:
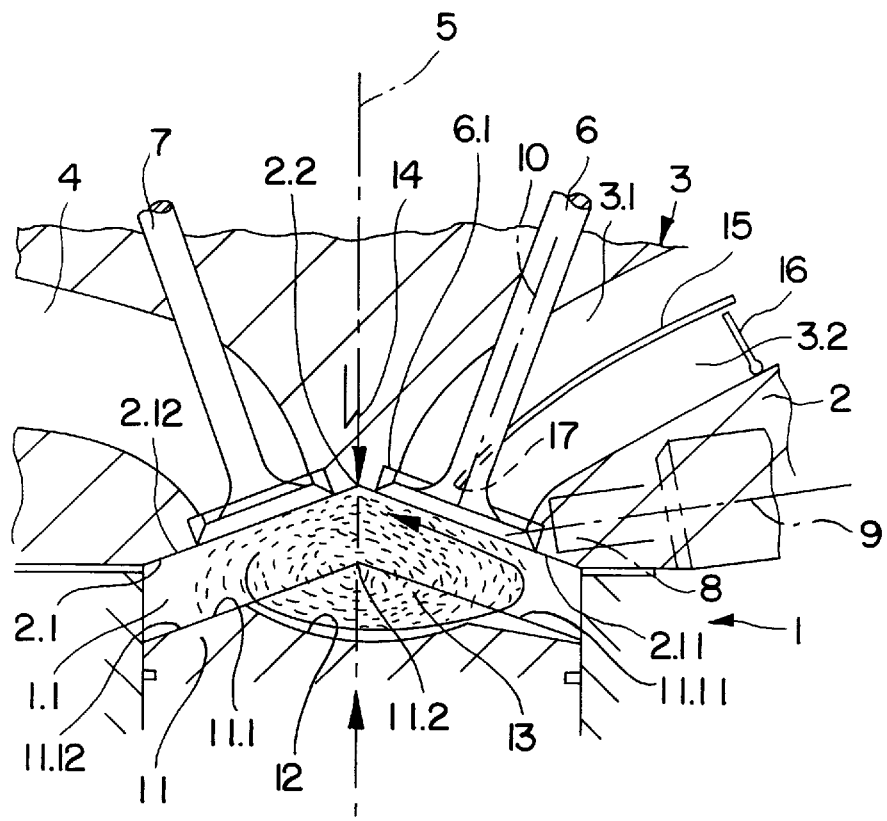
FIG. 1 is an axial sectional view of a preferred embodiment of the invention, depicting the moment of fuel injection during partial-load operation.
Figure 3:
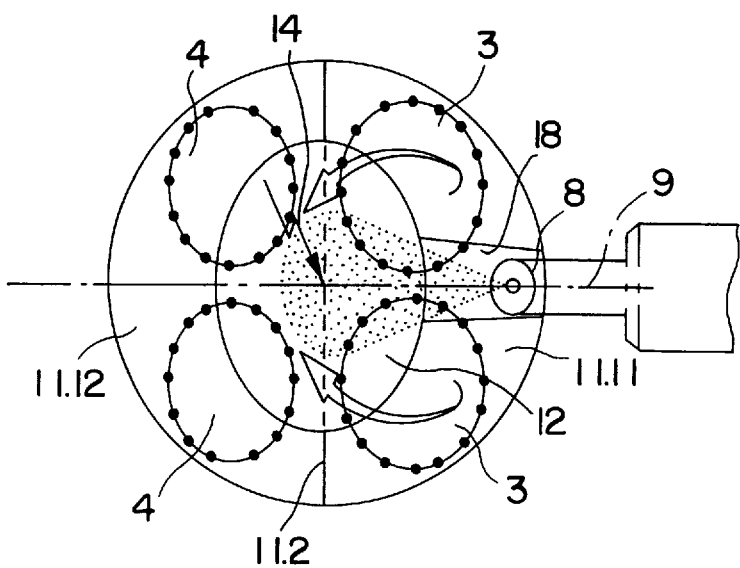
FIG. 3 is a schematic top plan view of a component of the preferred embodiment.

Turning to FIG. 1, a cylinder 1 of a piston-type internal-combustion engine is covered by a top wall 2.1 forming part of a cylinder head 2 which has two parallel air intake ports 3 (only one is visible) and two parallel exhaust ports 4 (only one is visible). The intake and exhaust ports 3 and 4 are inclined to the cylinder axis 5 and open into the cylinder chamber 1.1 under a relatively small acute angle related to the cylinder axis 5. The arrangement of the mouths of the two intake ports 3 to the mouths of the two exhaust ports 4 is shown in FIG. 3 in dash-dot projection. The intake ports 3 and the exhaust ports 4 are opened and closed by respective intake valves 6 and exhaust valves 7 (only one of each is shown in FIG. 1).

In the cylinder head 2, at a location adjoining the intake valves 6, a fuel injection nozzle 8 is disposed which may be a component of a high-pressure, direct-injection assembly according to the "common rail" technique. In cylinders having two air intake valves 6—as in the exemplary embodiment—the fuel injection nozzle 8 is situated between the two intake valves 6 as seen in FIG. 3. The fuel injection nozzle 8 is arranged at a height which corresponds approximately to the height of the lower edge of the respective valve seat rings 6.1 defining the lower edge of the air intake openings that merge into the cylinder chamber 1.1. The jet axis 9 of the fuel injection nozzle 8 is oriented towards the cylinder axis 5 (or to a line parallel to the axis 5) at an angle which is greater than the entrance angle of the intake ports 3 defined essentially by the axes 10 of the gas intake valves 6. The fuel jet axis 9 has a very flat course in the cylinder chamber (that is, it forms a small acute angle with a radial plane of the engine cylinder).

The top wall 2.1 of the cylinder 1 and the piston base 11.1 of the piston 11 have respective, substantially planar surfaces 2.11, 2.12 and 11.11, 11.12. The surfaces 2.11 and 2.12 are inclined to one another and meet in a ridge 2.2 and the surfaces 11.1, 11.12 are inclined to one another and meet in a ridge 11.2. The surfaces 11.11 and 2.11 and the surfaces 11.12 and 2.12 are in a face-to-face relationship and are substantially parallel to one another. Also, the surface 11.11 faces the intake valves 6, whereas the surface 11.12 faces the exhaust valves 7. Stated differently, the top wall 2.1 of the cylinder 1 and the piston base 11.1 of the piston 11 have an inverted V-shaped configuration when viewed in said sectional plane containing the cylinder axis 5.

In the center of the piston base 11.1 a curved (dished) recess or depression 12 is provided which is associated with the fuel injection nozzle 8. The depression 12, as it may be best observed in FIG. 3, interrupts the ridge 11.2 and extends at either side thereof, so that the depression 12 is bordered by the inclined surfaces 11.11 and 11.12.

FIG. 1 shows the position of the piston 11 in the cylinder chamber 1.1 in a stratified-charge operation, that is, for an operation during engine idling up to a partial-load condition. The fuel injection nozzle 8 injects the fuel jet 13 which spreads in a fan-like manner due to an appropriate nozzle configuration, into the cylinder chamber 1.1 while the cylinder valves 6 and 7 are already closed. During this occurrence the fuel jet 13 is "lifted" by the air flow guided over the surface of the dished depression 12 and essentially sweeps over the depression 12 of the piston base 11.1 without contacting it and is, while forming an ignitable mixture with the air charge present in the cylinder, deflected in a vortex-like manner towards the symbolically shown ignition device 14 and is ignited thereby. The ignition device 14 is generally in alignment with the cylinder axis 5. The purposefully designed charge motion is, in conjunction with the late injection moments during compression, utilized to pre-mix fuel and air in a locally restricted manner and to transport the mixture close to the ignition device 14. After ignition, the charge movement enhances the combustion.

By virtue of the configuration of the piston base 11.1 together with the dished depression 12, the charge motion generated during the suction stroke by virtue of the specially configured intake port 3 is enhanced and maintained to a substantial extent up to the end of the subsequent compression stroke of the piston 11. Further, the dish-shaped depression 12, in conjunction with the roof-shaped top wall 2.1 of the cylinder 1, effects an acceleration of the rolling charge motion (tumble) towards the end of the compression stroke as the volume of the principal combustion chamber is compressed to the depression 12 by virtue of the coordinated roof-shaped configuration of the cylinder top wall 2.1 and the piston base 11.1.

By virtue of a slight inclination of the dished depression 12 to the fuel jet 13 a substantially free jet length is ensured which avoids a wetting of the wall of the combustion chamber with the liquid fuel.

According to a further measure to ensure an expansion of the fuel jet 13 which is largely unimpeded by side wall effects, an extension 18 of the dished depression 12 is provided in the edge region of the piston base surface 11.11 oriented towards the injection nozzle 8. As particularly well seen in FIG. 3, the extension 18 has a longitudinal axis which lies in a plane that also contains the cylinder axis 5 and the jet axis 9.

After initiating the combustion, the charge motion enhances a further mixing of the yet uncombusted fuel and air and accelerates the combustion of the mixture.

Figure 2:
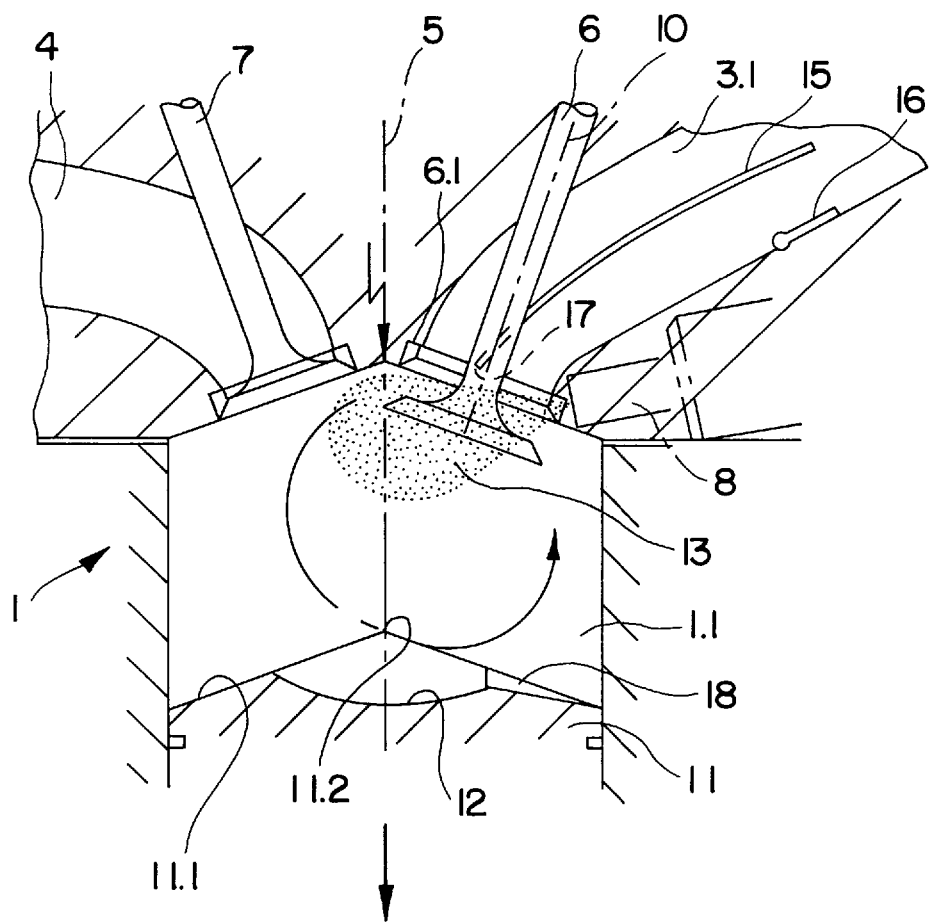
FIG. 2 is a view similar to FIG. 1, depicting the moment of fuel injection during full-load operation.

FIG. 2 shows the arrangement of the individual components relative to one another in a homogeneous operation, that is, in an operation under a high-load engine run. During the downward motion (suction stroke) of the piston 11 the intake valve 6 opens and in the expanded fuel jet 13 is injected into the inflowing fresh air by the fuel injection nozzle 8 ensuring that a desired satisfactory mixture formation may take place. After closing the intake valves 6 the turbulence of the cylinder charge leads, during the upward motion (compression stroke) of the piston 11, to the formation of a homogeneous fuel/air mixture whose combustion is then initiated by the ignition device 14. In such a mode of operation the effect of the depression 12 in the piston base 11.1 is of lesser significance because the mixture formation is achieved primarily by means of the fuel injection occurring in synchronism with the air intake process. The weakened charge motion which is preferred in this mode of operation, permits a combustion course that is advantageous regarding combustion noises and makes possible high throughput values in the intake system for enhancing a high specific output, is also advantageously used for this mode of operation by means of the mixture guidance effected by the combustion chamber configuration according to the invention.

A septum 15 oriented transversely to the cylinder axis 5 is disposed in at least one of the intake ports 3, dividing the intake port 3 into an upper partial port 3.1 and a lower partial port 3.2. The downstream terminal edge 17 of the septum 15 extends essentially to the location where the intake port 3 opens into the combustion chamber 13.

A controllable throttle 16 is disposed in the partial port 3.2 for influencing the formation of the air vortex in the cylinder chamber 1.1. Dependent upon the arrangement and the position of the throttle 16, a more or less pronounced rolling vortex is generated in the cylinder chamber 1.1. Such a vortex is stronger in case the throttle 16 is closed for the stratified-load operation and is less pronounced if the throttle 16 is open for the homogeneous operation.

It will be understood that the above description of the present invention is susceptible to various modifications, changes and adaptations, and the same are intended to be comprehended within the meaning and range of equivalents of the appended claims.

What is claimed is:

1. An internal-combustion engine comprising
   (a) an engine cylinder defining a combustion chamber and having
      (1) a cylinder axis;
      (2) a top wall having first and second surfaces being inclined to one another and meeting in a ridge, whereby said top wall has an essentially inverted V-shaped configuration when viewed in a sectional plane taken along said cylinder axis; said top wall forming part of a cylinder head; and
      (3) a lateral wall;
   (b) two air intake ports opening into the combustion chamber; at least one of said intake ports including
      (1) a septum longitudinally dividing said one air intake port into partial ports; said septum having a downstream end as viewed in a direction of intake air flow in said air intake port; said downstream end being situated substantially at a location where said air intake port opens into said combustion chamber; and
      (2) a controllable throttle disposed in one of said partial air intake ports for varying a free cross-sectional flow-through area thereof;
   (c) an intake valve disposed in each of said air intake ports for opening and closing said air intake ports; each said intake valve having a lower edge;
   (d) an exhaust port opening into the combustion chamber;
   (e) an exhaust valve disposed in the exhaust port for opening and closing the exhaust port;
   (f) a piston received for a reciprocating motion in the engine cylinder and having
      (1) a piston base oriented towards the top wall of the cylinder and bounding said combustion chamber; said piston base having first and second surfaces being inclined to one another and meeting in a ridge, whereby said piston base has an essentially inverted V-shaped configuration when viewed in said sectional plane; said first surface of said top wall facing said first surface of said piston base and being substantially parallel therewith; and said second surface of said top wall facing said second surface of said piston base and being substantially parallel therewith; and
      (2) a dished depression provided in said piston base; said dished depression interrupting said ridge and extending on either side thereof, whereby said dished depression is bounded by said first and second surfaces of said piston base;
   (g) a fuel injection nozzle having a jet axis and opening into the combustion chamber at a height level of the lower edges of said intake valves and at a location adjoining said lateral wall and being situated between regions where said air intake ports open into said combustion chamber; and
   (h) an ignition device situated in said top wall in alignment with said cylinder axis.

2. The internal-combustion engine as defined in claim 1, wherein said jet axis of said fuel injection nozzle forms a first angle with a line parallel to said cylinder axis; further wherein said air intake port opens into said combustion chamber at a second angle to a line parallel to said cylinder axis; said first angle being greater than said second angle.

3. The internal-combustion engine as defined in claim 1, wherein an angle of said jet axis to an inclination of said dished depression is selected such that in a stratified-charge operation a fuel jet emitted by said fuel injection nozzle is allowed to substantially freely expand in a space defined between said dished depression and said top wall of said cylinder.

4. The internal-combustion engine as defined in claim 1, wherein said first surface of said piston base is adjacent and oriented toward said fuel injection nozzle; further wherein an edge region of said dished depression in said first surface of said piston base has a channel-shaped extension oriented towards said fuel injection nozzle to provide for a substantially unimpeded expansion of a fuel jet emitted by said fuel injection nozzle.

5. The internal-combustion engine as defined in claim 4, wherein said channel-shaped extension opens into said dished depression and has a longitudinal axis lying in a plane containing said cylinder axis and said jet axis.

6. In an internal-combustion engine including an engine cylinder having a cylinder axis, a top wall and defining a combustion chamber;

an air intake port opening into the combustion chamber;

an intake valve disposed in the air intake port for opening and closing the air intake port;

an exhaust port opening into the combustion chamber;

an exhaust valve disposed in the exhaust port for opening and closing the exhaust port;

a piston received for a reciprocating motion in the engine cylinder and having a piston base oriented towards the top wall of the cylinder and bounding the combustion chamber;

a fuel injection nozzle opening into the combustion chamber and having a jet axis; and an ignition device situated in the top wall;

the improvement wherein said top wall of said cylinder has first and second surfaces being inclined to one another and meeting in a ridge, whereby said top wall has an essentially inverted V-shaped configuration when viewed in a sectional plane taken along said cylinder axis;

said piston base has first and second surfaces being inclined to one another and meeting in a ridge, whereby said piston base has an essentially inverted V-shaped configuration when viewed in said sectional plane;

said first surface of said top wall faces said first surface of said piston base and is substantially parallel therewith;

said second surface of said top wall faces said second surface of said piston base and is substantially parallel therewith;

said first surface of said piston base being adjacent and oriented toward said fuel injection nozzle; and further comprising a dished depression provided in said piston base; said dished depression interrupting said ridge and extending on either side thereof, whereby said dished depression is bounded by said first and second surfaces of said piston base; and a channel-shaped extension provided at an edge region of said dished depression in said first surface of said piston base; said channel-shaped extension being oriented towards said fuel injection nozzle to provide for a substantially unimpeded expansion of a fuel jet emitted by said fuel injection nozzle.

7. The internal-combustion engine as defined in claim 6, wherein said channel-shaped extension opens into said dished depression and has a longitudinal axis lying in a plane containing said cylinder axis and said jet axis.

* * * * *